United States Patent [19]
Stanuch et al.

[11] Patent Number: 5,884,997
[45] Date of Patent: Mar. 23, 1999

[54] LIGHT BAR

[75] Inventors: Edward S. Stanuch, Oak Forest; Sigmund S. Urbanski, Orland Park; Donald E. Weger, Bradley; Edward J. Stanuch, Frankfort, all of Ill.

[73] Assignee: Federal Signal Corporation, University Park, Ill.

[21] Appl. No.: 738,065

[22] Filed: Oct. 25, 1996

[51] Int. Cl.$^6$ ........................................ B60Q 1/46
[52] U.S. Cl. ..................... 362/493; 362/544; 362/240; 340/474; 340/472
[58] Field of Search .................. 362/35, 249, 240, 362/493, 543, 544; 340/468, 472, 474, 471

[56] References Cited

U.S. PATENT DOCUMENTS

| | | | |
|---|---|---|---|
| 3,564,497 | 2/1971 | Gazzo | 340/474 |
| 3,789,358 | 1/1974 | Ellis. | |
| 4,334,211 | 6/1982 | McConnell et al. | 340/474 |
| 4,543,622 | 9/1985 | Menke et al. | |
| 4,577,178 | 3/1986 | Hitora. | |
| 4,588,118 | 5/1986 | Ference et al. | |
| 4,595,904 | 6/1986 | Grosswill et al. | 362/35 |
| 5,027,260 | 6/1991 | Lyons et al. | 362/249 |
| 5,132,666 | 7/1992 | Fahs | 340/472 |

Primary Examiner—Thomas M. Sember
Attorney, Agent, or Firm—Leydig, Voit & Mayer, Ltd.

[57] ABSTRACT

A light bar for mounting on an emergency vehicle has a modular construction using trays for mounting lights. The trays are integral members having cells formed therein for receiving components of light fixtures. The light bar has two lighting tiers. The lights on the lower tier are received in the cells of the trays. The tops of the trays provide a platform for mounting lights on the upper tier. Alternatively, the upper-tier lights may be mounted on the upper shell of the housing of the light bar. Snap-fit fasteners are formed on the trays for mounting components of the lights. In one configuration, the light bar includes a speaker which has a driver mounted inside the light bar housing and a horn which fits in an opening in the housing and is coupled to the driver for transmitting audio signals.

36 Claims, 12 Drawing Sheets

LIGHT BAR

FIELD OF THE INVENTION

This invention relates generally to warning lights, and more particularly to a light bar for mounting on an emergency vehicle for providing warning signals.

BACKGROUND OF THE INVENTION

Light bars for mounting on emergency vehicles such as police cars, ambulances, fire trucks, etc. for providing warning signals come in a variety of sizes, shapes, configurations, and functions. Some light bars have a plurality of lights of different types enclosed in one housing (which may have several sections). An important advantage of such light bars over simple domeshaped warning lights is their versatility. Many different types of lights, such as stationary, strobe, oscillating, and rotating lights, can be packaged in the housing of a light bar to provide a variety of light options having different colors, intensity variations, and timing sequences for different purposes. For example, a light bar may be equipped with transient lights for warning signals, an array of stationary lights sequentially flashed to provide traffic management signals, and flood lights for illumination purposes. It is also common to include a speaker in a light bar for providing audio warning signals.

The lights enclosed in a light bar are typically customized according to the specific combinations desired by customers. Due to the different budgets, applications, and preferences of the customers, the specific combination of lights in a given light bar model may differ significantly from order to order. Thus, the light components in a light bar are typically mounted in an ad hoc fashion one by one into the housing. Such an assembling process can be rather labor intensive and slow, thereby increasing the cost of the light bar.

Moreover, it is difficult to design the layout of a given light bar model to be sufficiently universal to accommodate all different combinations desired by customers. In existing light bars with a plurality of lights enclosed in a housing, the light fixtures are typically fastened by screws onto a metal structural support member, and the number of lights and the possible combinations of lights are significantly restricted by the length and structure of the metal structural member. In some cases, significant modifications of the metal structural member or the shells of the housing would be required in order to accommodate certain light combinations. Such modifications, however, can be prohibitively expensive.

A related common problem with existing light bars is that the access to individual components in a light bar may become blocked as more components are packed in the housing of the light bar, thereby compromising the serviceability of the light bar. This problem is especially prominent in certain existing two-level light bars, in which the lights mounted on the upper level and the dividers separating the two levels tend to block direct access to the lights on the lower level. Thus, even simple service jobs, such as replacing a light bulb or removing a color filter, can be rather time consuming and inconvenient.

Another unsatisfactory aspect of existing light bars is the way speakers are incorporated in the light bars. Light bars with speakers commonly have multiple sections, and the section containing the speaker is separated from other sections containing lights. The speaker section is typically covered by a formed sheet-metal cover which has perforations or slots to allow sound to be transmitted to the exterior. Light devices, which can be damaged by water, dust, etc., cannot be used in the speaker section. This not only results in significant waste of valuable interior space but also compromises the flexibility in combining lights into different patterns.

SUMMARY OF THE INVENTION

In view of the foregoing, it is a primary object of the present invention to provide a light bar structure that is easy and fast to assemble while also being sufficiently flexible so as to facilitate customization of the combination of lights and other features in the light bar.

It is a more specific object of the present invention to provide a multiple-tier light bar that not only is simple to assemble and flexible in accommodating different light combinations but also provides easy access to the light fixtures on different tiers so that the light bar can be serviced easily.

It is a related object of the present invention to provide simpler and faster mounting of components of the lights in the light bar so as to significantly reduce the labor cost for assembling the light bar.

It is another object of the present invention to provide a light bar that integrates a speaker in the light bar without compromising the efficient use of interior space for mounting lights or the flexibility of different light combinations.

In accordance with these and other objects of the present invention, there is provided a two-tier light bar that has a modular construction which utilizes trays with integrally formed cells for receiving and fastening components of light fixtures. The light bar has at least one set of interfitting upper and lower shells joined at a seam, and at least one tray positioned in a recess of the lower shell of the housing. The top of the tray is at a height that substantially matches the height of the seam of the housing. A plurality of cells are formed in the tray, each for receiving components of a light fixture such that the cell provides a functioning light source when it is equipped with the components. The light fixtures received in the cells of the tray define a lower tier of lights substantially disposed along a horizontal plane below the seam of the housing. A plurality of light fixtures form an upper tier of lights positioned above the lower tier and substantially disposed along a second horizontal plane above the seam.

In one configuration, the light bar has a speaker mounted therein. The speaker includes a driver mounted inside the housing and a horn coupled to the driver for transmitting sound to the exterior of the light bar. The housing has a speaker opening formed therein. The horn is fitted in the speaker opening and forms a gasketed connection with the housing. In this way, the housing remains sealed from the environment, thereby allowing light fixtures to be mounted in the same housing with the speaker.

It is a feature of the present invention to use trays which are integral members with cells formed therein to provide a modular structure of the light bar. The use of the trays has many significant advantages. For instance, using such trays provides significant freedom and flexibility in designing the layout of lights in the light bar, instead of being constrained by the shape and length of the metal structural member as in the past. The flexibility is further enhanced by using different trays designed to meet specific needs.

Thus, the light bar can be easily adapted to accommodate a variety of light fixtures in different combinations without having to modify the other structural components of the light bar, such as the outer shells or the metal structural member.

Moreover, the light cells on the tray can be formed to have standardized mounting means for mounting standardized components of light fixtures without the need to use special adapters. Such standardization results in significant simplification of the assembling process.

Another feature of the present invention associated with the use of molded plastic trays is that the trays can be molded to have snap-fit fasteners or mounting means. Such snap-fit fasteners make the mounting of components of the light fixtures, such as light reflectors and filters or lenses, extremely easy, resulting in significant reduction of the time and labor involved in mounting the components in the light bar.

It is another feature of the present invention that a speaker is mounted in the light bar in such a way that the housing remains a sealed container. As a result, light fixtures can be placed in the same housing with the speaker. The speaker mounting arrangement of the present invention therefore avoids inefficient use of space or compromise in the flexibility of different light combination.

Other objects and advantages will become apparent with reference to the following detailed description when taken in conjunction with the drawings in which:

Figure 1:
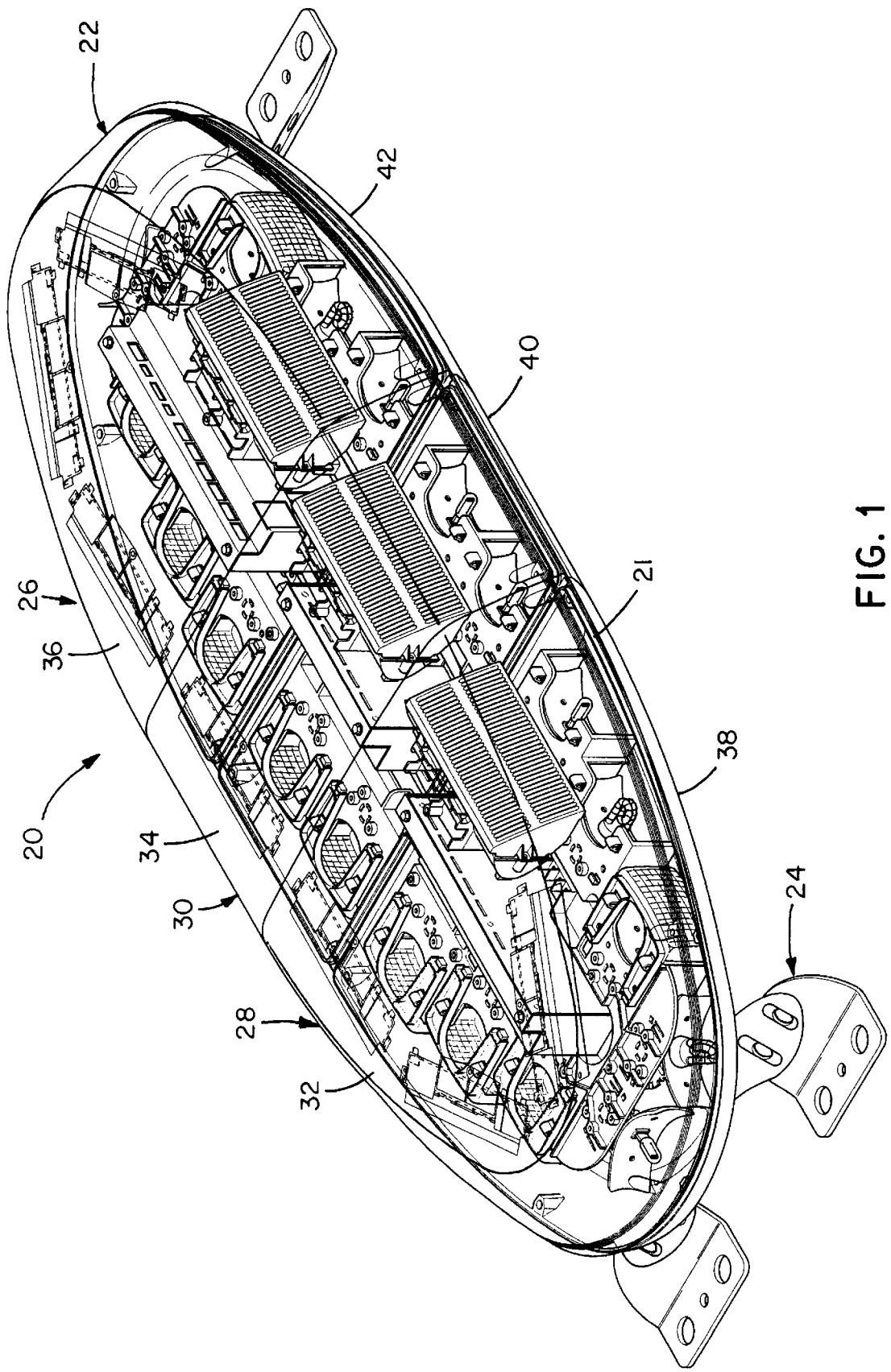
FIG. 1 is a perspective view of a two-tier light bar constructed according to the present invention.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the intention is to cover all modifications, alternative constructions and equivalents falling within the spirit and scope of the invention as defined by the appended claims.

DETAILED DESCRIPTION OF THE PREFERRED EMBODIMENT

Turning now to the drawings, FIG. 1 shows an embodiment of a light bar 20 constructed according to the present invention. The light bar 20 has a housing 22 with a generally elliptical shape and a plurality of lights disposed inside the housing. The light bar 20 is designed for mounting on an emergency vehicle by means of an adjustable mounting fixture 24, with the lengthwise direction of the light bar transverse to the forward direction of the vehicle.

In the illustrated embodiment, the light bar has three sections, including a left side section 26, a right side section 28, and a center section 30. Another center section can be added to the light bar to allow incorporation of more lights in the light bar. Each section of the housing has a set of interfitting upper and lower shells which form a closed container. Thus, the housing includes upper shells 32, 34, 36, and the corresponding lower shells 38, 40, 42. The upper shells join the respective lower shells at a seam 21 which surrounds the light bar. As will be described in greater detail below, the lights in the light bar 20 are arranged in two tiers, one above the seam 21 and one below the seam, to provide a variety of warning functions.

The upper and lower shells of each section interfit to form a substantially sealed container for protecting light fixtures mounted therein from the elements in the environment. The shells are preferably molded of a substantially transparent high-impact plastic material such as polycarbonate, and are preferably clear, although they may be colored, or certain portions of the shells may be made opaque to prevent light emission in certain selected directions.

Figure 2:
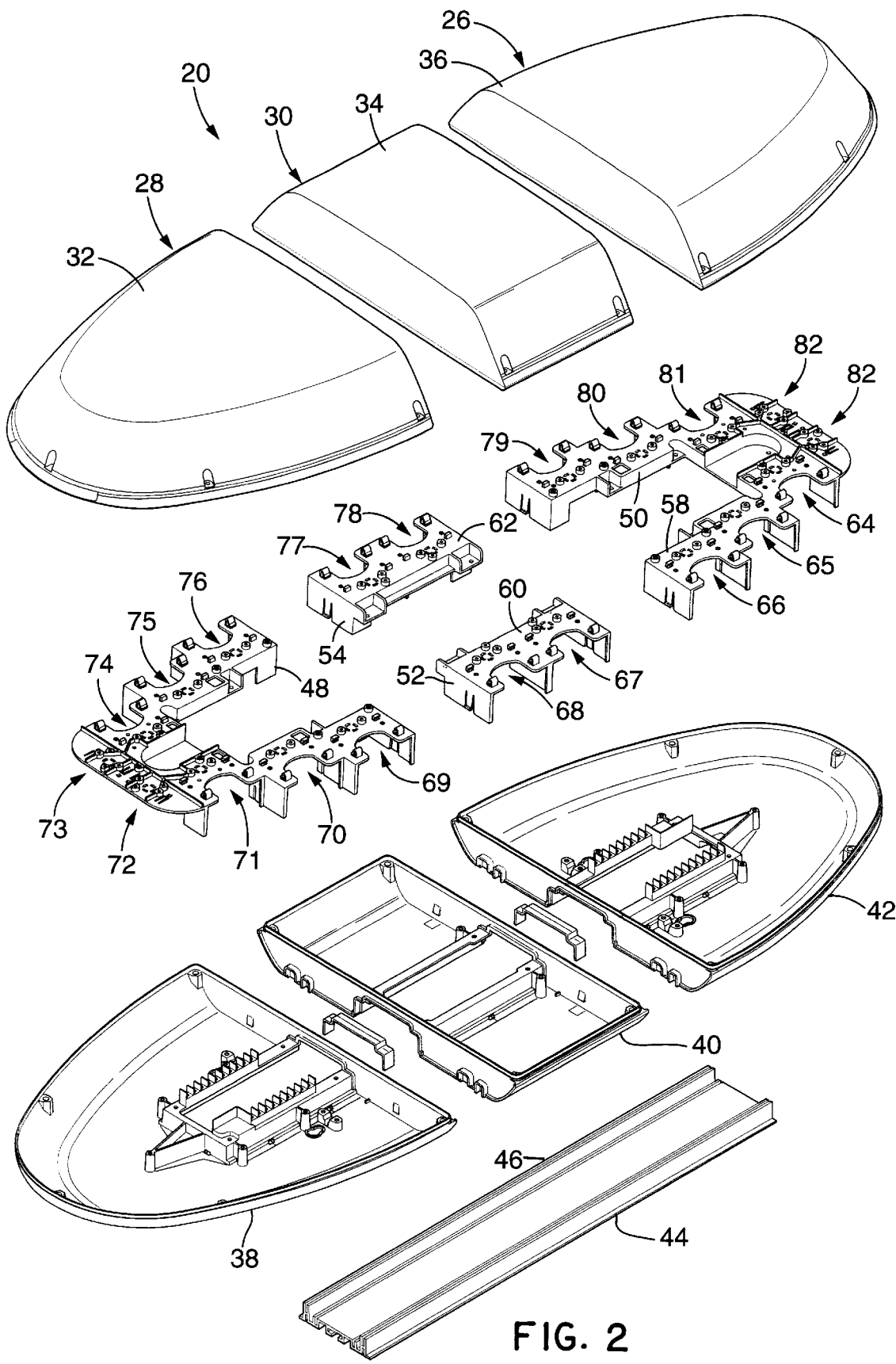
FIG. 2 is an exploded perspective view of the two-tier light bar showing the modular structure of the light bar utilizing molded trays for mounting lights.

FIG. 2 shows the basic structural components of the light bar of FIG. 1 without the lights mounted therein. As illustrated, the housing includes three sections 28, 30, 26 with upper shells 32, 34, 36 and lower shells 38, 40, 42, respectively. The lower shells 38, 40, 42 of the three sections are rigidly secured to a structural support member for structural support. In the illustrated embodiment, the structural support member is an extruded aluminum beam 44 which has a length significantly shorter than the overall length of the light bar. The structural rigidity of the light bar is further enhanced by the use of interlocking ribs 46 disposed on the opposing sides of adjacent lower shells.

In accordance with the present invention, the light bar has a modular construction which is achieved by the use of trays with cells for mounting lights. As illustrated in FIG. 2, The side sections 26, 28 have side trays 50, 48, respectively, disposed therein in the recesses of the lower shells 38, 42 around the ends of the aluminum beam 44. The center section 30 has a front tray 52 and a rear tray 54 disposed in the recesses in the lower center shell 40 on the two sides of the aluminum beam 44. The trays are preferably molded of plastic.

The trays 40, 48, 50, 52 are attached to the respective lower shells 38, 42, 40. The thickness of the trays is such that the tops 56, 58, 60, 62 of the trays when mounted in the lower shells have a height that substantially matches that of the seam 21 (FIG. 1) of the housing. The tops of the trays separate a lower tier of lights which is below the seam from an upper tier of lights above the seam. The tops of the trays also provide a platform for mounting lights on the upper tier.

As illustrated in FIG. 2, one or more sides of each tray are formed into cells each for receiving components of a light fixture such that the cell provides a functional light source when it is equipped with the components. In the illustrated embodiment, the lower tier of the light bar includes cells 64–83.

There are many significant advantages provided by this modular construction. For instance, the use of molded trays provides significant freedom and flexibility in designing the layout of the lights in both the upper and lower tiers of the light bar. The trays can be molded to have mounting means at selected locations for mounting different combinations of lights. Since the lights do not have to be directly mounted on the structural support member, the number of lights and their possible locations are not restricted by the length and configuration of the structural support member.

Since the trays can be shaped to position the lights at the desired locations, the need to use special mounting brackets to locate the lights in their proper positions is eliminated. This allows the lights to be mounted in a non-linear pattern, which again provides significant freedom in arranging the beam directions and angular coverages of the lights in the light bar.

A related advantage of using such molded trays for mounting lights is that it is no longer necessary for the structural member to run substantially the full length of the light bar. In the illustrated embodiment, the aluminum beam 44 is made significantly shorter than the overall length of the light bar. The reduction of the length of the structural member results in significant saving in material cost and weight.

The flexibility of the modular construction of the present invention also resides in that the trays can be easily modified to suit specific needs. Trays of different configurations can be used to cover a wide variety of possible light combinations without having to alter the design of the housing or the structural support member. This flexibility not only allows the light bar to be easily adapted for a variety of different light combinations desired by customers but also allows the light bar to be easily modified to meet, for example, changes in government regulations or industrial standards.

The use of trays formed with cells for mounting lights also provides the opportunity to simplify and standardize the mounting means on the trays and the components of light fixtures. The cells formed on the trays are preferably made to have substantially identical mounting means for accepting standardized components of light fixtures. The standardization results in significant simplification and flexibility of the assembling process.

Figure 3:
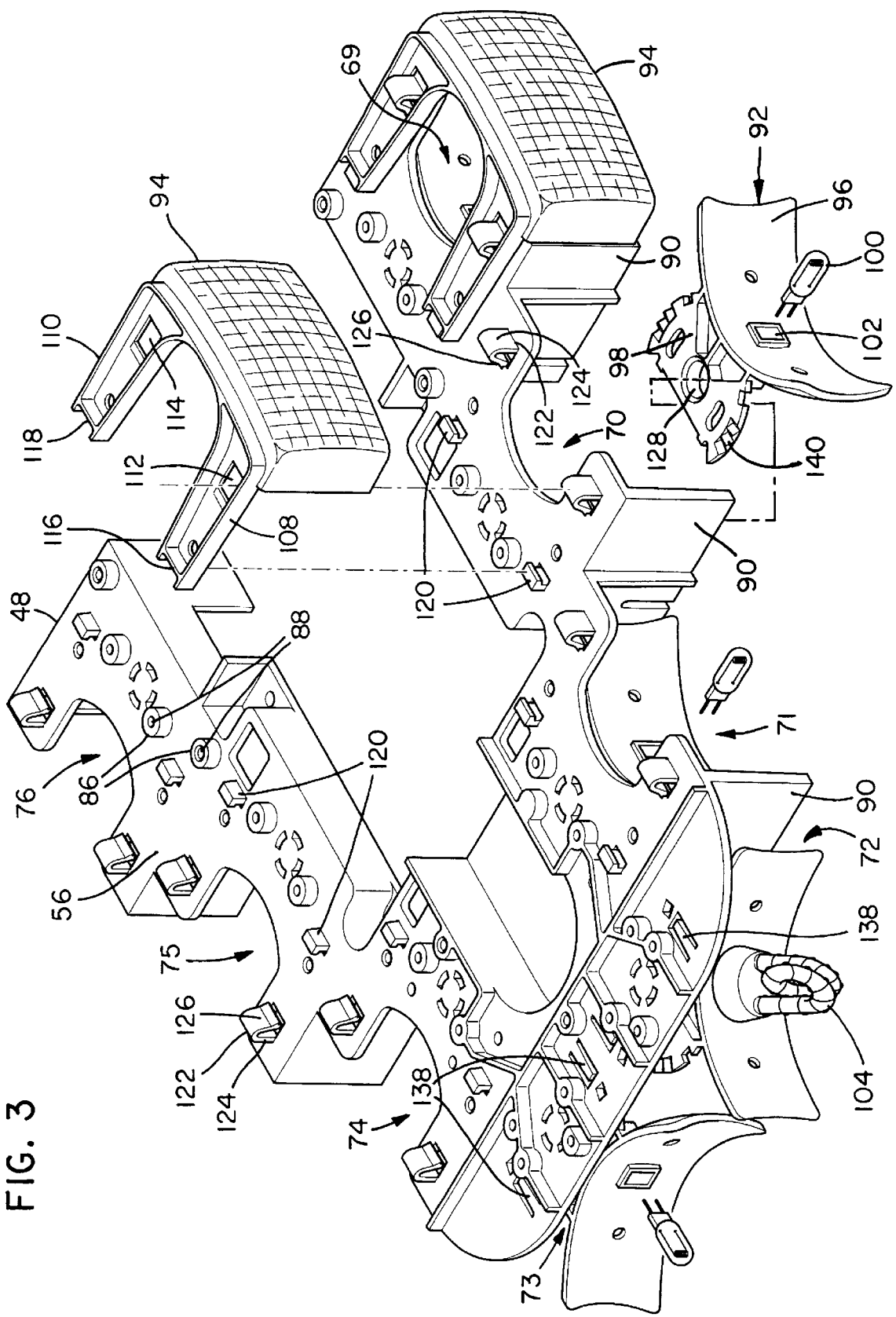
FIG. 3 is an exploded perspective view of a molded tray with components of light units mounted thereon.

To further illustrate the advantages of the modular construction of the light bar of the present invention, FIG. 3 shows the side tray 48 used in the right side (passenger side) section of the light bar. In many applications, the side tray in the left side (driver side) section will be the mirror image of the right side tray. As illustrated in FIG. 3, the tray 48 has a generally flat top 56 on which the upper-tier lights can be mounted. For that purpose, the top 56 of the tray 48 is molded to form a plurality of bosses 86 disposed at selected locations. The bosses 86 have central holes 88 which can receive screws driven into them. Thus, lights on the upper tier can be fastened by screws to the bosses 88 on the top 56.

The tray 48 has a plurality of vertical dividers 90 downwardly extending from the top 56. The dividers 90 divide the sides of the tray 48 into a plurality of light cells, including three front cells 69, 70, 71, two side cells 72, 73, and three rear cells 74, 75, 76. The front cells 69–71 form a staggered array, i.e., they are offset from one another in the forward direction of the light bar. The rear cells 74–76 are similarly staggered. The dividers 90 prevent the stray light generated by a light fixture disposed in the front or rear array from entering an adjacent light fixture on the lower tier.

The cells 69–76 are configured to accept standardized light fixture components including light reflectors and filters. The use of standardized components for different types of lights results in significant saving in tooling and simplifies the assembling process, while at the same time retains the flexibility to combine different types of lights on the lower tier.

In the illustrated embodiment, a light fixture for mounting in the cells on the lower tier includes a light reflector 92 and an optional filter 94. The light reflector 92, which is preferably molded of plastic, has a curved (e.g., parabolic) mirror 96 and a base 98 extending generally transversely from the back of the mirror. The mirror 96 is coated with a reflective surface for reflecting and focusing the light generated by a light bulb 100.

The reflector 92 also serves as a light bulb holder. A light bulb receptacle 102 is formed at the center of the mirror 96 for receiving a matching light bulb 100. The form and size of the light bulb receptacle 102 depends on the type of the bulb used. For instance, in the illustrated embodiment, the front cells 69–71 and the side cell 73 are equipped with halogen bulbs, while the side cell 72 is equipped with a high-intensity strobe lamp 104 which is used as an "intersection light."

It is a feature of the present invention that the trays can have integrally formed snap-fit fasteners or mounting means that allow the components of the light fixtures to be quickly and easily mounted on the tray. As shown in FIG. 3, the filter 94 has two arms 108, 110 extending transversely from the filter body. The arms 108, 110 have mounting openings 112, 114, respectively, formed therein. For each of the front cells 69–71 and rear cells 74–76 there are indexing tabs 120 and hold-down clips 122 integrally molded on the top 56 of the tray 48. Each hold-down clip 122 has a generally U-shaped cross section, with a fixed leg 124 and a deflectable leg 126. To mount the filter 94, the ends 116, 118 of the arms 108, 110 of the filter are butted against the indexing tabs 120 of a light cell, and the arms are then pushed down to force the hold-down clips 122 to pass through the mounting openings by deflecting the deflectable legs 126 of the clips. When the filter 94 is properly mounted, the ends of deflectable legs 126 of the hold-down clips 122 push on the arms of the filter, thereby holding the filter in position.

Figure 4:
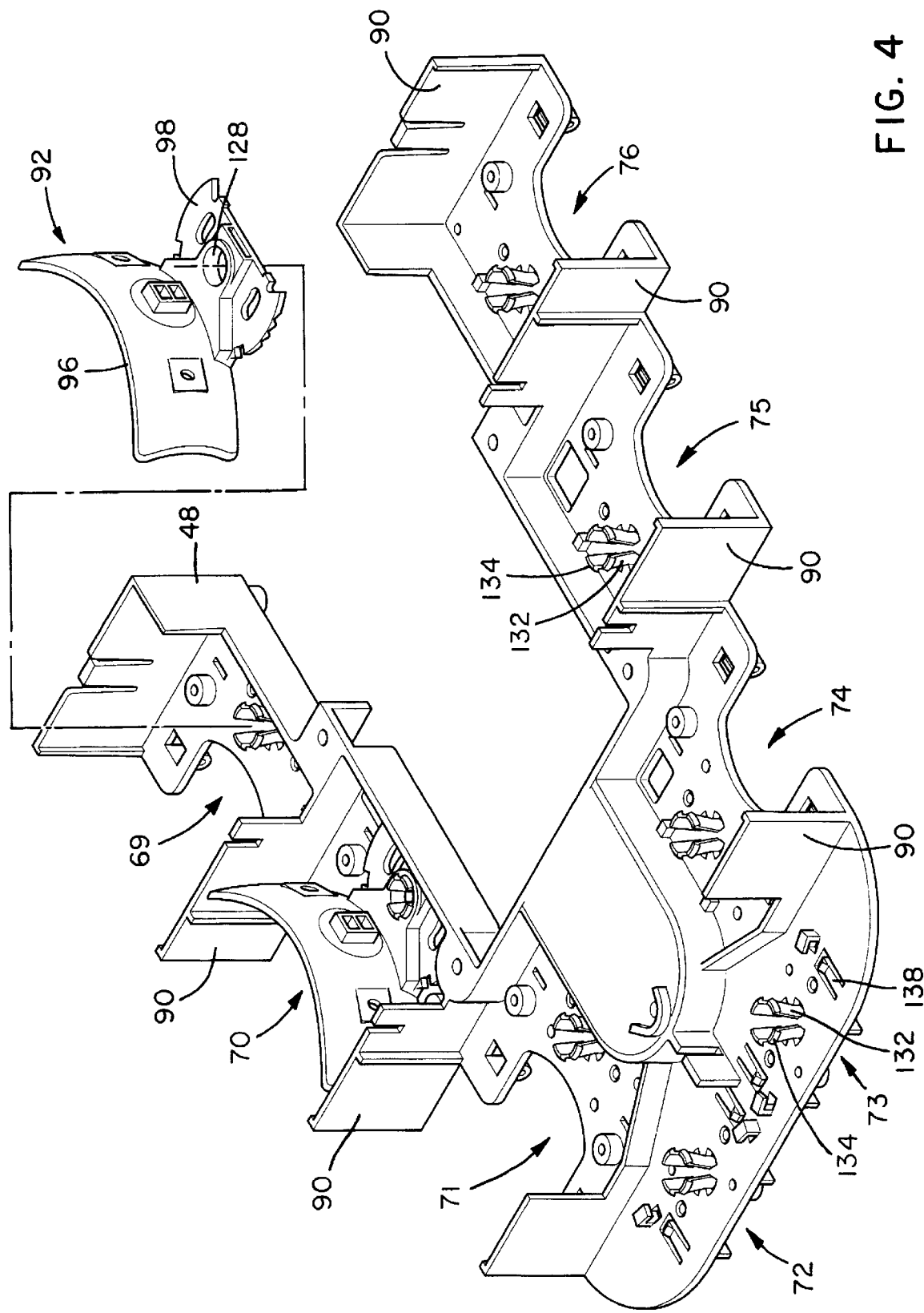
FIG. 4 is a perspective view showing the underside of the tray of FIG. 3 with snap-fit fasteners for mounting light reflectors.

The light reflectors 92 are also mounted by means of snap-fit fasteners. The base 98 of each reflector 94 has a mounting aperture 128 formed therein. Turning now to FIG. 4, for each of the cells 69–76 there is an annular split snap-ring 132 formed on the under side of tray. Each snap-ring 132 has a retention ledge 134 formed at its lower end. The reflector 92 is mounted on the tray 48 by simply pushing the reflector down to force the snap-ring 132 to pass through the mounting aperture 128 of the reflector, and the retention ledge 134 then securely holds the reflector on the tray.

Depending on the applications, the angular position of the reflector 92 may be fixed or adjustable. For example, in the illustrated embodiment, the beam directions of the lights in the front and rear cells 69–71, 74–76 are preferably fixed. If the angular position of the reflector 92 is to be fixed, stops may be provided on the underside of the tray 48 to prevent the reflector from rotating about the snap-ring 132 on which the reflector is mounted.

Alternatively, the angular position of the reflector 92 may be made adjustable so that the beam direction can be selected according to local regulations or preferences of the customers. For example, in the embodiment of FIG. 3, a halogen light is mounted in a side cell 73 and oriented generally towards the side of the light bar to serve as an "alley light." The beam direction of this alley light is adjustable by using the indexing mechanism illustrated in FIG. 5, which includes indexing fingers 138 molded on the tray and indexing teeth 140 formed on the base 98 of the reflector. The angular position of the reflector 92 can be adjusted by rotating the reflector about the snap-ring 132, and the indexing fingers 138 and teeth 140 cooperate to retain the reflector in the selected angular position.

Figure 5:
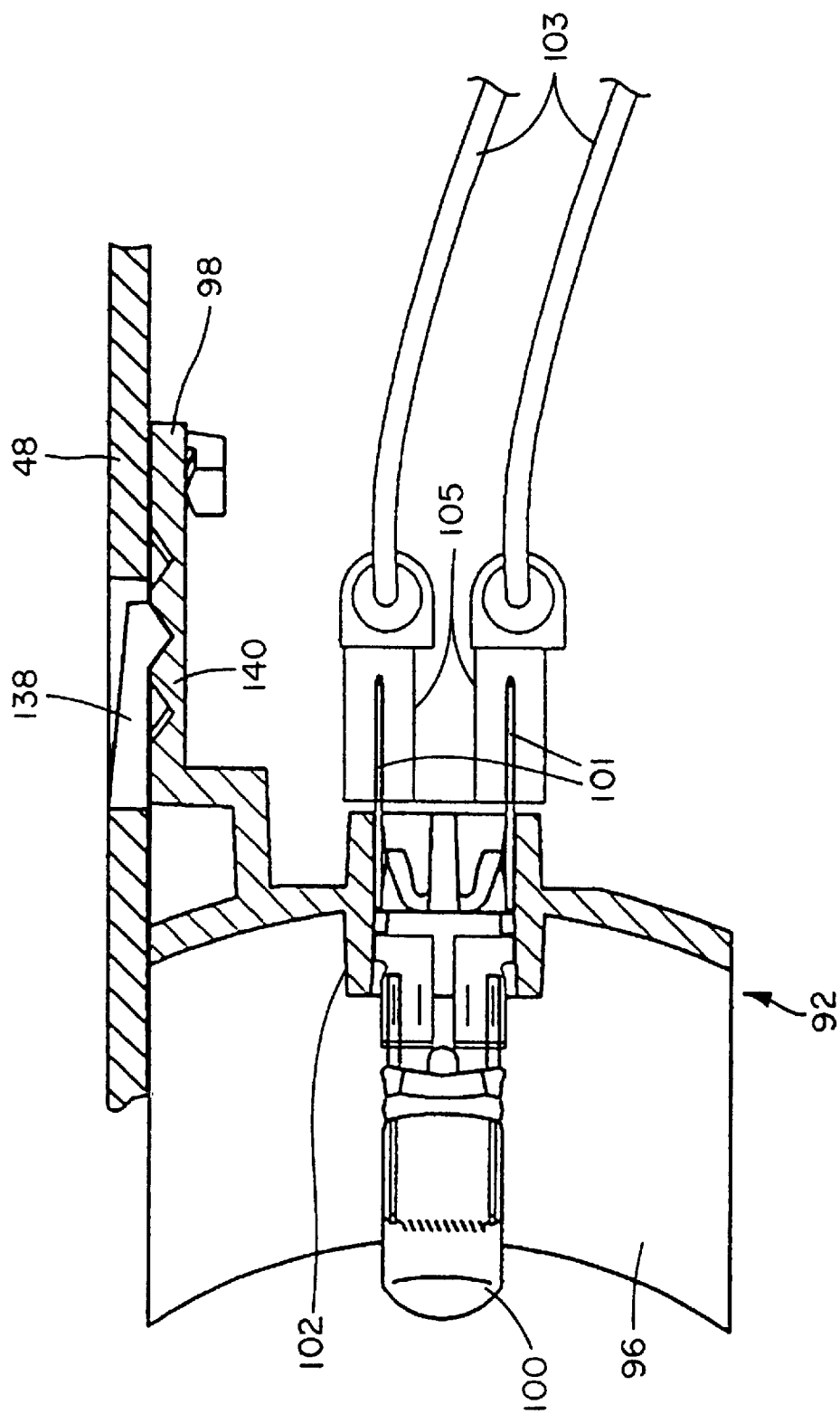
FIG. 5 is a cross sectional view showing an indexing mechanism on the tray for indexing the angular position of a light reflector.

As illustrated in FIG. 5, the light reflector 92 is molded with a light bulb receptacle 102 for receiving a light bulb 100. In the illustrated embodiment, the receptacle 102 is formed to receive and retain two connection pins 101 which form electrical connection with the light bulb. Wires 103 for supplying electrical power to the light bulb are connected to the pins 101 via push-on connectors 105.

Figure 6:
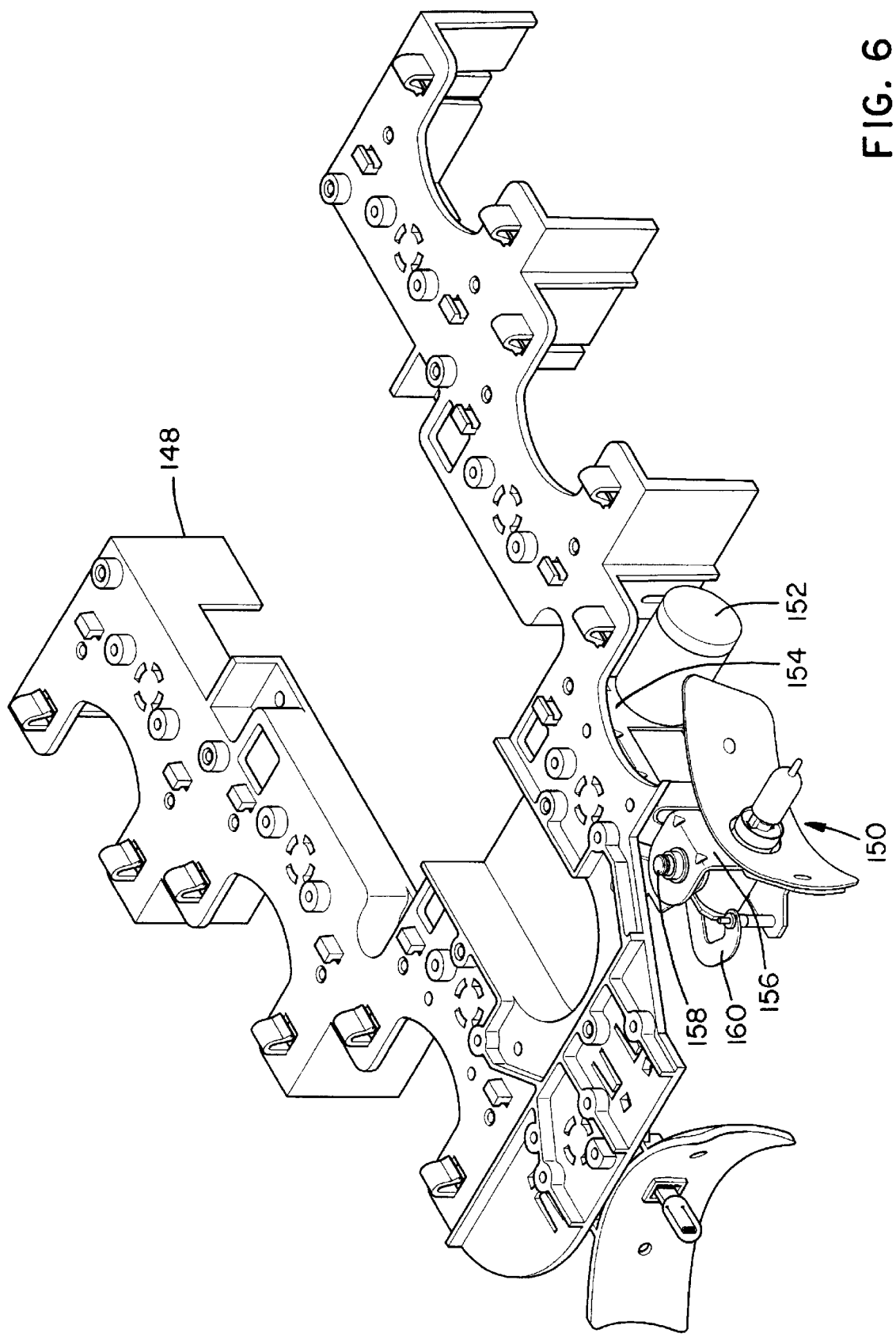
FIG. 6 is a perspective view of an alternative embodiment of the tray for an optional light combination.

FIG. 6 shows an alternative embodiment of the side tray, which illustrates the flexibility of the modular structure of the present invention in accommodating different light combinations. With only slight modifications, the tray 48 of FIG. 5 is converted into the tray 148 of FIG. 6 which is configured for mounting an oscillating intersection light 150, in contrast to the stationary intersection light 104 in FIG. 5. It will be appreciated that neither the housing 22 nor the metal structural member 44 of the light bar has to be modified to accommodate this change in light combination.

The motor 152 for driving the oscillating intersection light 150 is mounted on a mounting bracket 154 which is securely attached to the underside of the tray. The intersection light 150 is mounted on its mounting bracket 156 for rotation about a pivot 158, and is coupled to the motor motion 152 via a link 160. In the preferred embodiment, the oscillating intersection light 150 is driven by the motor 152 to sweep an arc of about 120°, and the center line of the sweep is set at an angle of about 45° from the forward direction towards the side. Thus, the oscillating intersection light is capable of providing high intensity warning light over a wide angle to approaching vehicles when the emergency vehicle enters an intersection.

Figure 7:
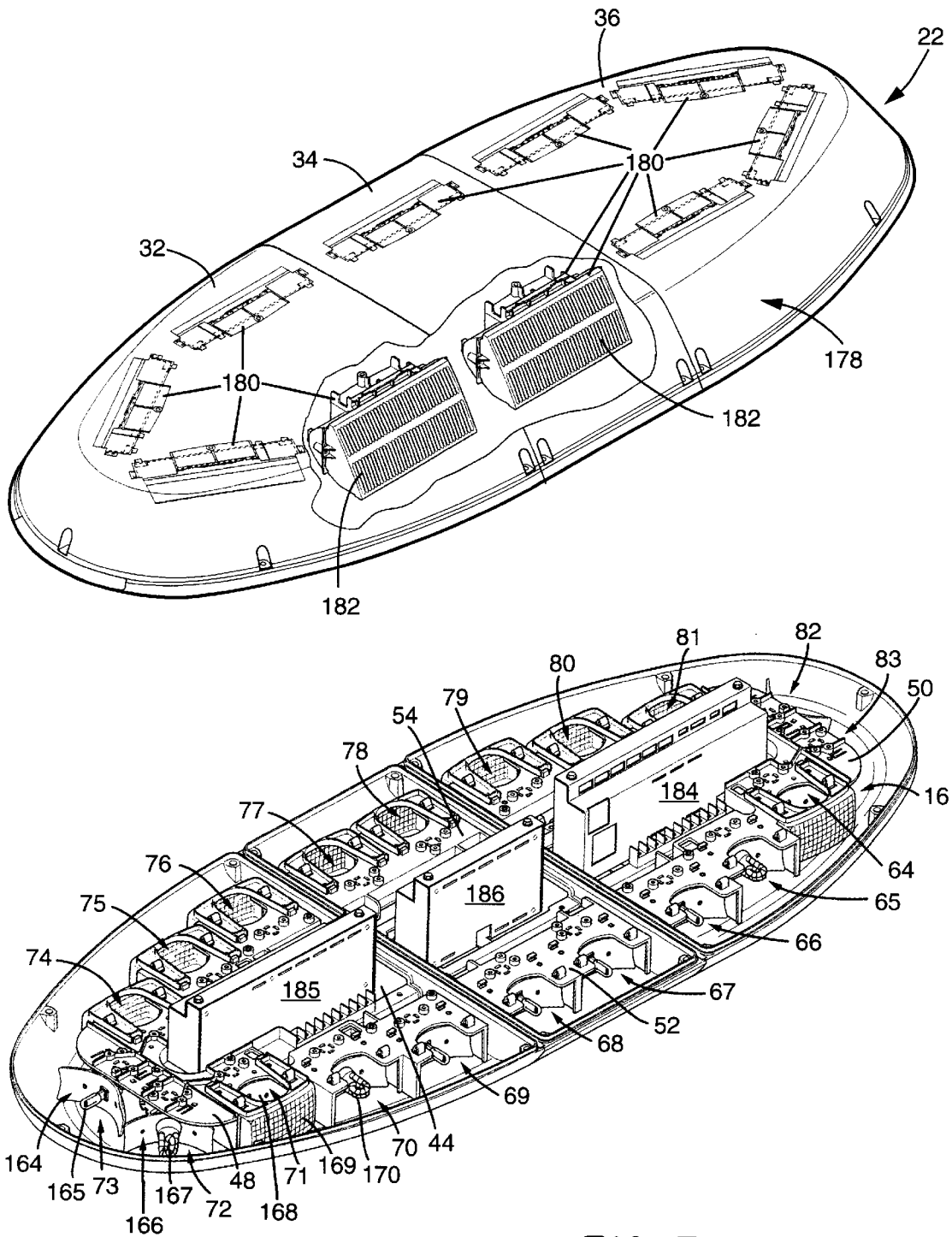
FIG. 7 is an exploded, partially cut-away, perspective view of the light bar showing an exemplary combination of lights disposed in the light bar.

One exemplary light combination using the trays 48, 50, 52, 54 of FIG. 2 is shown in FIG. 7. As illustrated, the trays 48, 50, 52, 54 are mounted in the recesses of the lower shells 38, 40, 42, and the tops of the trays are about even in height with the upper edges of the lower shells which form the seam 21 (FIG. 1) with the lower edges of the upper shells. The lights in the cells form a lower tier of lights disposed in a horizontal plane below the seam.

In this combination, the lower tier 162 of the light bar is equipped with stationary lights for different functions. More specifically, an alley light 164 (with a halogen bulb 165) and a stationary intersection light 166 (with a strobe lamp 167) are mounted in the side cells 72, 73 of the side tray 48. In the front cell 71 adjacent the intersection light 166 is mounted a halogen flashing light 168 with a filter 169 which may be used to provide turn signals. A directional strobe light 170 is disposed in the front cell 70 for providing warning signals in the forward direction. The arrangement of lights in the left side tray 50 is a mirror image of that in the right side tray. The four center front cells on the lower tier, including the two cells 67, 68 on the front center tray 52 and the cells 69, 66 on the side trays 48, 50, respectively, are equipped with halogen lights without filters and serve as "take-down" lights for providing flood light toward the front of the vehicle.

The rear cells 74–81 on the trays are all equipped with halogen flashing lights and properly colored filters to form an array of traffic management lights. The traffic management lights can be operated sequentially from left to right, from right to left, or from center to the sides to provide traffic management signals to vehicles passing by the emergency vehicle.

The upper tier 178 of the light bar with the illustrated light combination includes ten strobe lights 180 for providing primary warning signals. The strobe lights form the upper tier of lights in a horizontal plane above the seam 21 (FIG. 1). In FIG. 7, the upper shells 32, 34 of the housing are partially cut away to reveal two of the strobe lights. As illustrated, each strobe light 180 has a lens 182 for controlling the beam spread of the strobe light. The beam directions of the strobe lights 180 are arranged to provide a full 360° coverage of warning signals.

Because the lights in the light bar structure of the present invention do not have to be tied to the metal structural support member, there is significant freedom and flexibility in designing the locations and beam directions of the lights. As a feature of the illustrated embodiment, the width and the curved contour of the light bar housing 22 allows the strobe lights 180 to be positioned in a non-linear arrangement.

Figure 8:
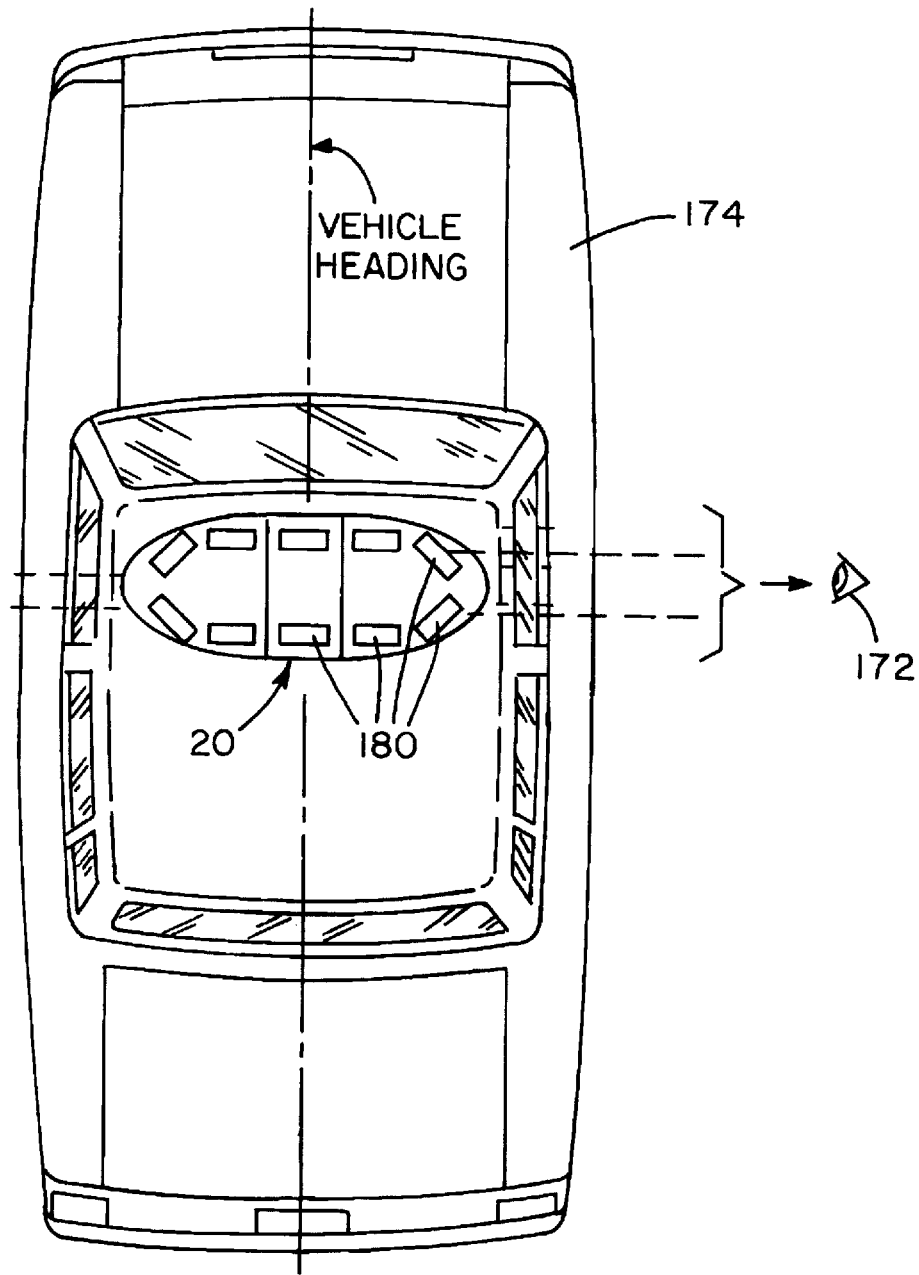
FIG. 8 is a schematic illustration of the light bar of FIG. 7 mounted on an emergency vehicle showing how the shape of the housing allows for two or more discrete beams of light to be seen from any vantage point around the light bar, thus providing enhanced warning ability to the flank or side of the vehicle.

As can be best seen in the schematic illustration of FIG. 8, this non-linear arrangement of the lights 180 significantly enhances the visibility of the light bar 20, because a viewer 172 at any vantage point in the horizontal plane around the light bar can see two or more discrete beams of warning light. The enhanced visibility provides improved warning ability to the flanks or sides of the emergency vehicle 174 on which the light bar is mounted. It will be appreciated that such non-linear arrangement can be advantageously used with other types of warning lights such as rotating or oscillating lights.

In accordance with a feature of the illustrated embodiment, the strobe lights 180 are mounted on the upper shells of 32, 34, 36 of the housing of the light bar. This arrangement provides improved serviceability. When a light in either the upper tier 178 or lower tier 162 has to be serviced, the upper shell of the section in which the light is disposed is detached from the lower shell, and all the lights in both upper and lower tiers of that section can be easily reached. The use of the snap-fit fasteners on the trays as described above makes replacing the components of the lower-tier lights easy and fast.

In the illustrated embodiment, the light bar has two power supplies 184, 185 for the strobe lights 180 on the upper tier 178 and a power supply 186 for the strobe lights on the lower tier 162, including the intersection lights 166 and the directional strobe lights 170. The power supplies are mounted on the extruded aluminum beam 44 which not only provides structural support for the power supplies but also serves as a heat sink for dissipating the heat generated thereby.

Figure 9:
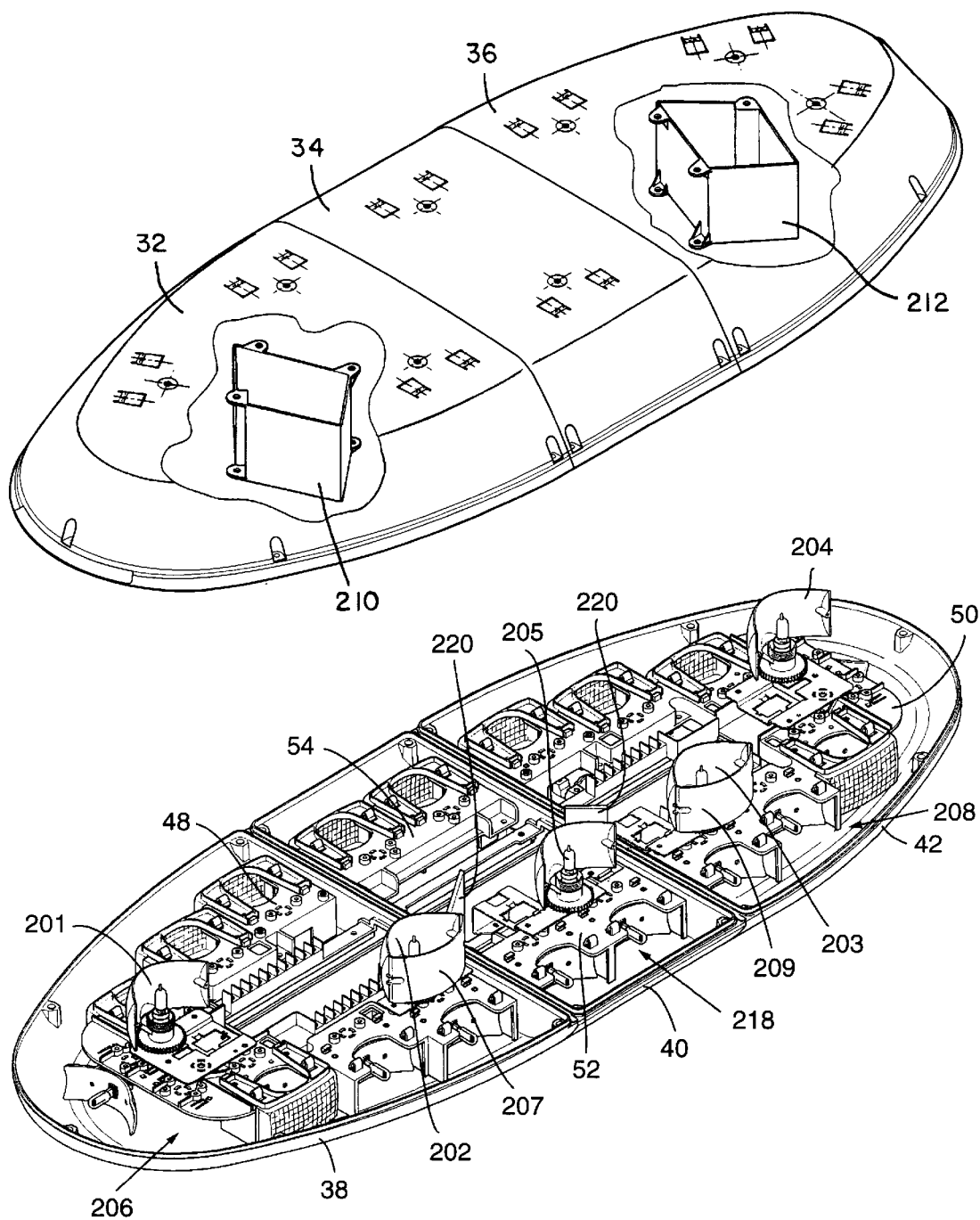
FIG. 9 is an exploded, partially cut-away, perspective view similar to FIG. 7 but showing another combination of lights.

FIG. 9 shows an alternative light combination of the light bar, again using the trays 48, 50, 52, 54 of FIG. 2. The lower-tier lights in this combination are generally the same as those in the combination of FIG. 7, except that the intersection lights 166 (FIG. 7) are removed from the side trays. The upper tier of lights includes five rotating lights 201–205 with halogen bulbs for proving warning signals 360° around the light bar. For illustration purposes, two rotating lights 202, 203 are shown to have color filters 207, 209, respectively, mounted thereon. As described above, the top surfaces of the trays 48, 50, 52, 54 provide a platform for mounting the upper-tier lights 201–205. Depending on the locations of the upper-tier lights, the extruded aluminum beam 44 can also be used to provide support for the upper tier lights. It will be appreciated that even with the upper-tier lights mounted on the trays, the lower-tier lights can still be easily accessed for replacement of the light components.

Figure 10:
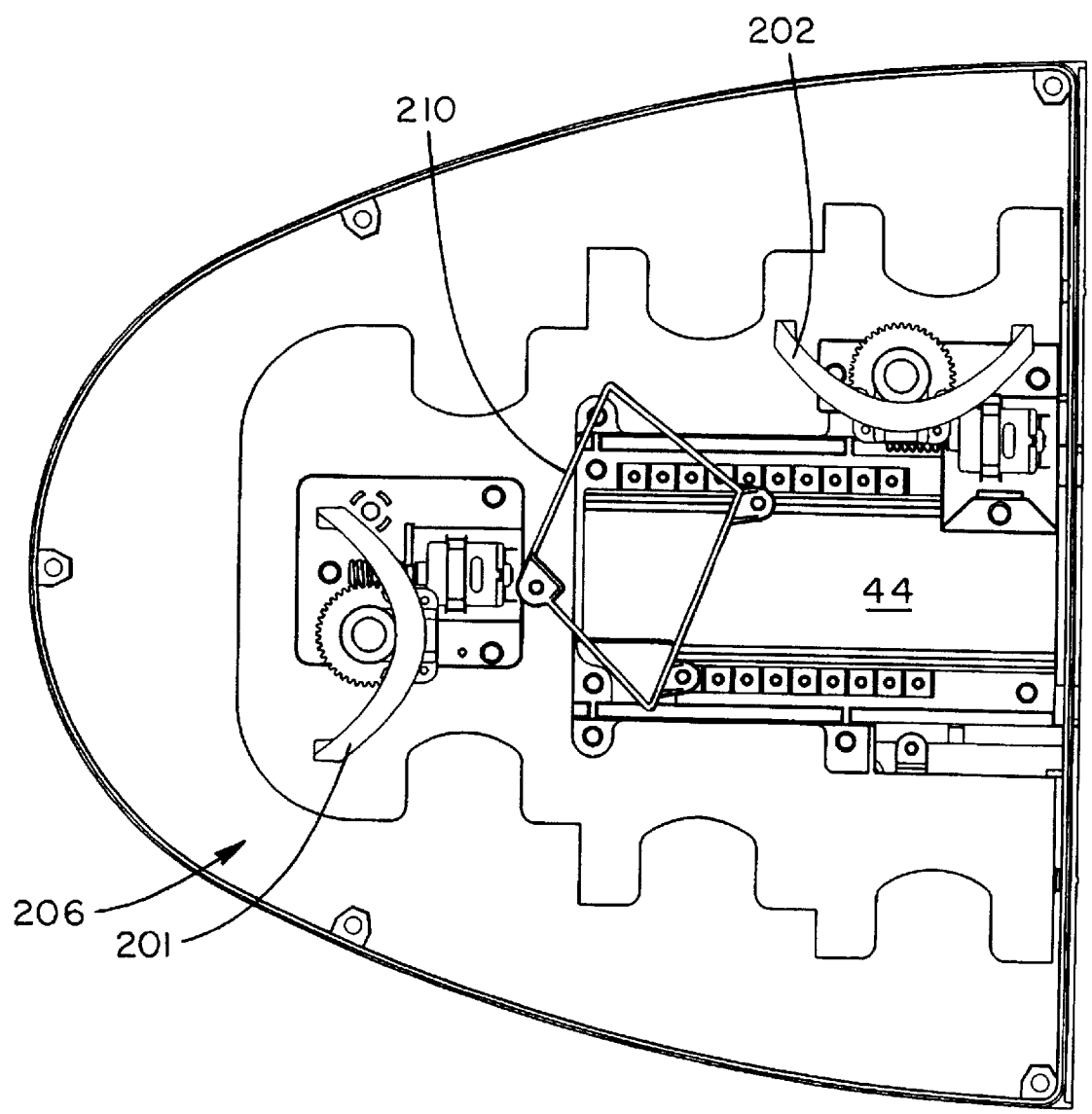
FIG. 10 is a plan view of the light bar with the combination of lights of FIG. 9.

In this combination, the side sections 206, 208 of the light bar have, respectively, mirrors 210, 212 each having multiple sides forming a dimond-shaped cross section for reflecting light beams generated by the rotating lights. The diamond-shaped mirrors 210, 212 are mounted on the upper shells 214, 216 of the respective side sections to allow easy access to the rotating lights when the upper shells are removed. The center section 218 has two mirrors 220 in a V-shaped arrangement for reflecting the light generated by the central rotating light 205. FIG. 10 illustrates the relative locations of the rotating lights 201, 202 and the diamond-shaped mirror 210 in the right side section 206 of the light bar. The arrangement of the rotating lights 203, 204 and the mirror 212 in the left side section 208 is preferably a mirror image of that of the right side section.

Figure 11:
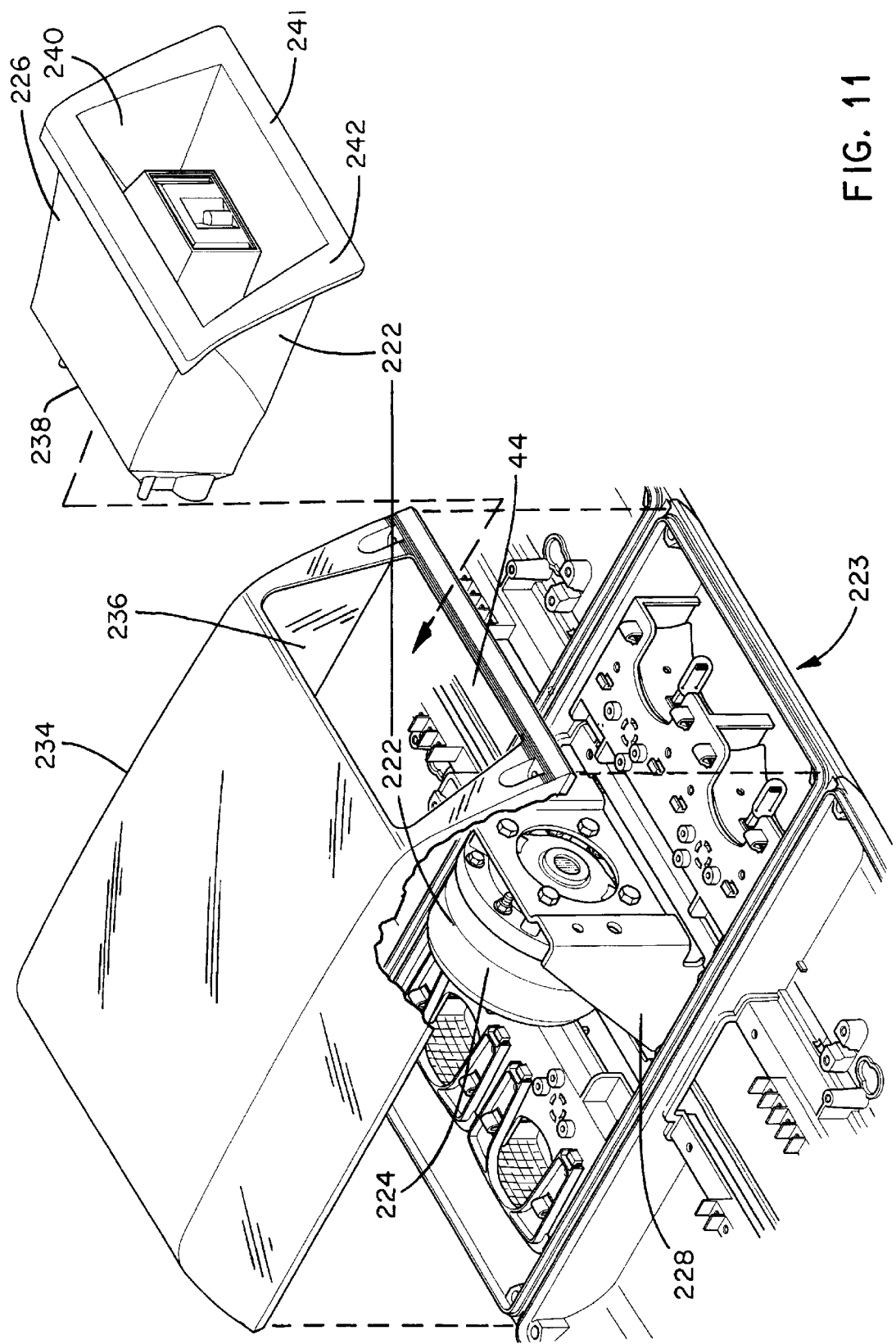
FIG. 11 is an exploded, fragmentary, perspective view of the center section of an alternative embodiment of the light bar having a speaker mounted therein.

FIG. 11 shows yet another embodiment of the light bar which includes a speaker 222 for providing audio warning signals and delivering verbal instructions. The speaker 222, which is disposed in the center section 223 of the light bar, includes a driver 224 and a horn 226 facing the front of the light bar. The driver 224 is mounted on a vertical bracket 228 which is in turn mounted on the extruded aluminum beam 44.

In accordance with a feature of the illustrated embodiment, the upper shell 234 of the center section 223 has a speaker opening 236 formed therein. The flared body of the horn 226 is fitted through the speaker opening. The inner end 238 of the horn is connected to the driver 224 for receiving acoustic energy generated thereby. The acoustic energy is passed through the horn 222 and coupled to the exterior of the light bar through the opening 240 at the outer end 241 of the horn which meets the speaker opening 236.

Figure 12:
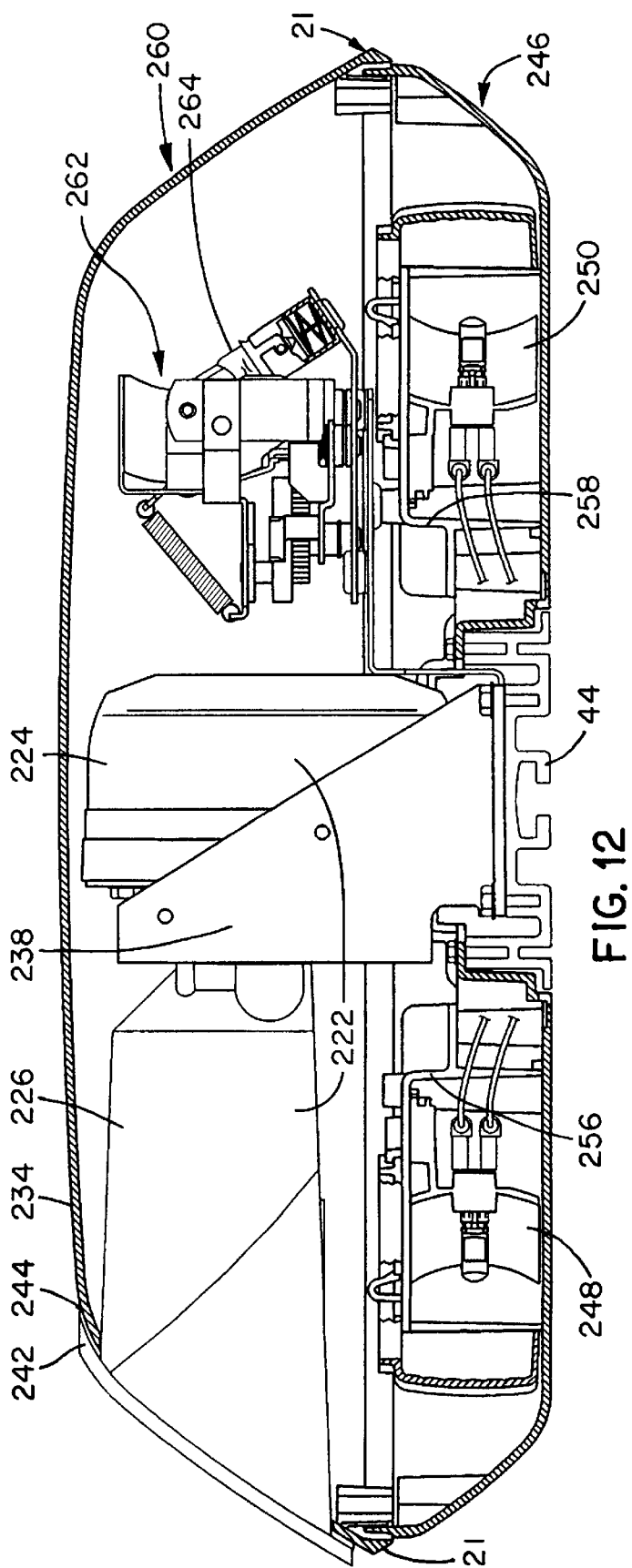
FIG. 12 is a cross sectional view of the embodiment of the light bar of FIG. 11.

The horn 226 has a lip 242 at the outer end surrounding the opening 240. The lip 242 is shaped to match the contour of the upper shell 234 surrounding the speaker opening 236. As illustrated in FIG. 12, a gasket 244 is disposed and compressed between the lip 242 of the horn and the upper shell 234 to form an air-tight connection. In this way, the center section remains a sealed container to protect the lights therein from elements in the exterior environment.

Figure 13:
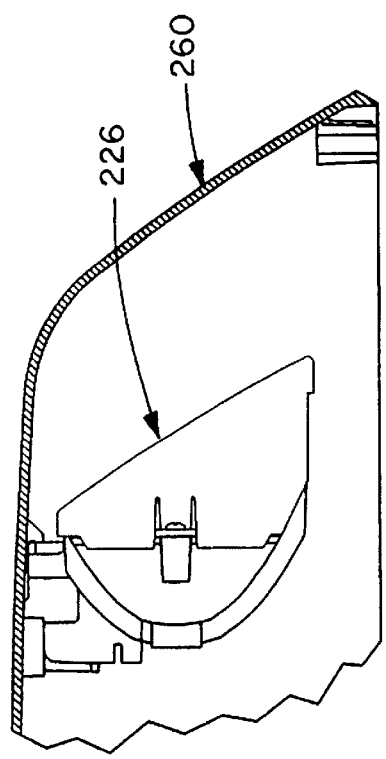
FIG. 13 is a fragmentary cross sectional view of the light bar of FIG. 12 but showing an alternative light combination.

By virtue of the speaker mounting arrangement described above, the inclusion of the speaker 222 in the light bar does not result in the exclusion of lights in the center section. As shown in FIG. 12, the lower tier 246 of the center section includes front and rear halogen lights 248, 250 with filters on the front and rear center trays, 256, 258, respectively. The lights 248 on the front tray 256 are directly under the speaker. The upper tier 260 of the center section has a halogen warning light 262 mounted directly behind the speaker 223. The halogen warning light 262 has a halogen lamp mounted on an oscillating mechanism 264 that sweeps the beam direction of the lamp in both horizontal and vertical directions. FIG. 12 shows only an exemplary combination of lights, and other types of lights may be used in the center section with the speaker 222. For instance, the halogen lights on the lower tier 246 may be replaced by strobe lights. FIG. 13 shows yet another alternative combination in which the upper tier 260 in the center section of the light bar has a stationary strobe light 266 mounted on the upper shell behind the speaker 222 (not shown).

It should now be appreciated that what is provided is a modular structure of a light bar which utilizes trays with cells formed therein for mounting lights.

This modular structure provides significant flexibility in accommodating different combinations of lights. As illustrated in the embodiments described above, this modular structure allows lights to be arranged on two tiers in a neat, uncluttered fashion for enhanced serviceability. It will also be appreciated, however, that the modular structure can also be used for constructing single-tier light bars or light bars with more than two tiers of lights without deviating from the scope and spirit of the present invention.

In connection with the modular structure, the present invention provides a speaker mounting arrangement that allows a speaker and light fixtures to be incorporated in the same sealed housing. The inclusion of the speaker therefore does not compromise the efficient use of space or flexibility of light combination in the light bar.

What is claimed is:

1. A light bar for mounting on an emergency vehicle comprising: a housing having at least one set of upper and lower shells joined at a seam; at least one tray in a recess of the lower shell of the housing; a plurality of cells formed in the tray, each for receiving and fastening components of a light fixture such that the cell provides a functioning light source when it is equipped with the components; the light fixtures received in the cells of the tray defining a lower tier of lights substantially disposed along a first horizontal plane; an upper tier of lights positioned above the lower tier and substantially disposed along a second horizontal plane; a top of the tray being at a height that substantially matches a height of the seam formed where the upper and lower shells join, such that the lower tier of lights is below the seam and the upper tier of lights is above the seam.

2. The light bar of claim 1, wherein the tray includes integrally molded snap-fit fasteners for mounting components of the light fixtures.

3. The light bar of claim 2, wherein the components of the light fixtures include a light reflector snap-fit mounted on the tray.

4. The light bar of claim 3, wherein the reflector has a light bulb receptacle integrally formed therein, the light bulb receptacle being formed to receive and retain connection pins for forming connections with electrical wires.

5. The light bar of claim 3, wherein the components of the light fixtures further include a filter snap-fit mounted on the tray.

6. The light bar of claim 1, wherein the top of the tray provides a platform for mounting light fixtures on the upper tier of lights.

7. The light bar of claim 6, further including at least one light reflecting element attached to the top of the tray.

8. The light bar of claim 6, wherein the upper tier of lights includes a rotating light, and wherein the light bar further includes a mirror mounted on the upper shell of the housing for reflecting light generated by the rotating light.

9. The light bar of claim 1, wherein the upper tier of lights includes light fixtures mounted on the upper shell of the housing.

10. The light bar of claim 1, wherein the housing includes a left side section, a right side section, and at least one center section, each of the sections of the housing having a set of interfitting upper and lower shells and the at least one tray.

11. The light bar of claim 1, wherein the housing is formed of substantially transparent molded plastic.

12. The light bar of claim 1, wherein the upper tier of lights includes a transient light source selected from the group of strobe light, oscillating light, and rotating light.

13. The light bar of claim 1, wherein the lower tier of lights includes a light having a beam direction between a front direction of the light bar and a side direction transverse to the front direction.

14. The light bar of claim 1, wherein the lower-tier of lights includes an oscillating light having a center line of sweep disposed between a front direction of the light bar and a side direction transverse to the front direction.

15. The light bar of claim 1, wherein the lower tier of lights includes a light having a beam direction about transverse to a front direction of the light bar.

16. The light bar of claim 1, wherein the lower tier of lights includes a light mounted on the tray to have an adjustable angular position, and wherein the tray includes means for indexing the angular position of the light with adjustable angular position.

17. The light bar of claim 1, wherein the cells of the tray form at lest one staggered array.

18. The light bar of claim 17, wherein the tray includes a plurality of dividers downwardly extending from a top of the tray, the dividers separating the cells forming the staggered array and blocking light transmission therebetween.

19. The light bar of claim 1, further including a speaker mounted inside the housing having a driver and a horn, a first end of the horn coupled to the driver for receiving acoustic energy generated by the driver, a second end of the horn extending through an opening in the housing for transmitting the acoustic energy to an exterior of the light bar, the horn sealingly coupled to the housing to maintain the housing sealed from an exterior environment.

20. The light bar of claim 19, wherein the speaker is oriented in a forward direction of the light bar, and wherein the upper tier of lights includes a light mounted behind the speaker.

21. The light bar of claim 20, wherein the light mounted behind the speaker is an oscillating light which sweeps in both vertical and horizontal directions.

22. The light bar of claim 1, wherein at least one of the lower and upper tiers of lights includes a light having a variable beam direction.

23. A light bar for mounting on an emergency vehicle comprising: a housing of upper and lower shells; a rigid structural support member securely coupled to the lower shell member for providing rigidity to the light bar and cooperating with an interior area of the lower shell to provide a recess for receiving at least one tray; the tray being an integral member comprising a plurality of cells, each cell made to receive and fasten components of a light fixture; and at least one of the components shaped to form a reflector and fasten a lamp to a cell for illuminating the reflector.

24. The light bar of claim 23, further including a plurality of lights mounted inside the housing above the tray.

25. The light bar of claim 24, further including a speaker mounted in the housing, the speaker having a driver mounted on the structural support member and a horn coupled to the driver and extending through an opening in the housing, the horn sealingly coupled to the housing to maintain the housing sealed from an exterior environment.

26. A light bar for mounting on an emergency vehicle comprising: a housing for at least one light source; a speaker mounted within the housing having a horn and a driver; a first end of the horn coupled to the driver for receiving acoustic energy generated by the driver; a second end of the horn extending through an opening in the housing for transmitting the acoustic energy to an exterior of the light bar, the horn sealingly coupled to the housing to maintain the housing sealed from an exterior environment.

27. The light bar of claim 26, wherein the second end of the horn has a peripheral lip for forming gasketed coupling with the housing.

28. The light bar of claim 26, wherein the light bar has at least one pair of interfitting upper and lower shells.

29. The light bar of claim 26, wherein the housing includes a tray which is an integral member comprising a plurality of cells each made to receive and fasten components of a light fixture.

30. The light bar of claim 29, further including lights mounted above the tray.

31. The light bar of claim 30, wherein at least one of the lights mounted above the tray has a variable beam direction.

32. A light bar for mounting on an emergency vehicle comprising: a housing; a tray having cells extending from a central support member for receiving and fastening components of light fixtures which define a lower tier of lights; an upper tier of light fixtures within the housing mounted directly above the lower tier of lights; the housing having a shape that cooperates with positions of the light fixtures in the upper and lower tiers such that two or more distinct beams of light from the light fixtures of at least one of the upper and lower tiers are visible at any viewing angle in a horizontal plane.

33. The light bar of claim 32, wherein the housing includes at least one pair of interfitting shells.

34. The light bar of claim 32, further including a speaker mounted inside the housing, the speaker extending through an opening in the housing and sealingly coupled to the housing to maintain the housing sealed from an exterior environment.

35. A light bar for mounting on an emergency vehicle comprising: a housing having at least one set of upper and lower shells joined at a seam; a lower tier of warning fixtures substantially disposed along a first horizontal plane below the seam; an upper tier of warning fixtures positioned above the lower tier and substantially disposed along a second horizontal plane above the seam; the warning fixtures in one of the tiers including a speaker mounted inside the housing, the speaker extending through an opening in the housing and sealingly coupled to the housing to maintain the housing sealed from an exterior environment, and the fixtures in the other tier including a light located directly above or below the speaker.

36. The light bar of claim 35, wherein the speaker includes a horn and a driver, the horn coupled at a first end to the driver and flared to meet an opening of the housing at a second end.

* * * * *